E. T. ROBINSON.
CLUTCH.
APPLICATION FILED OCT. 22, 1910.
1,007,977.
Patented Nov. 7, 1911.
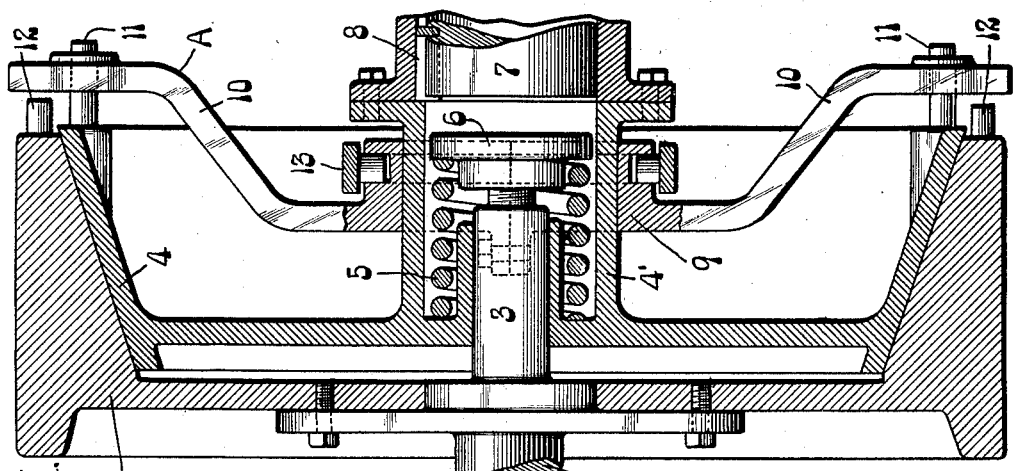
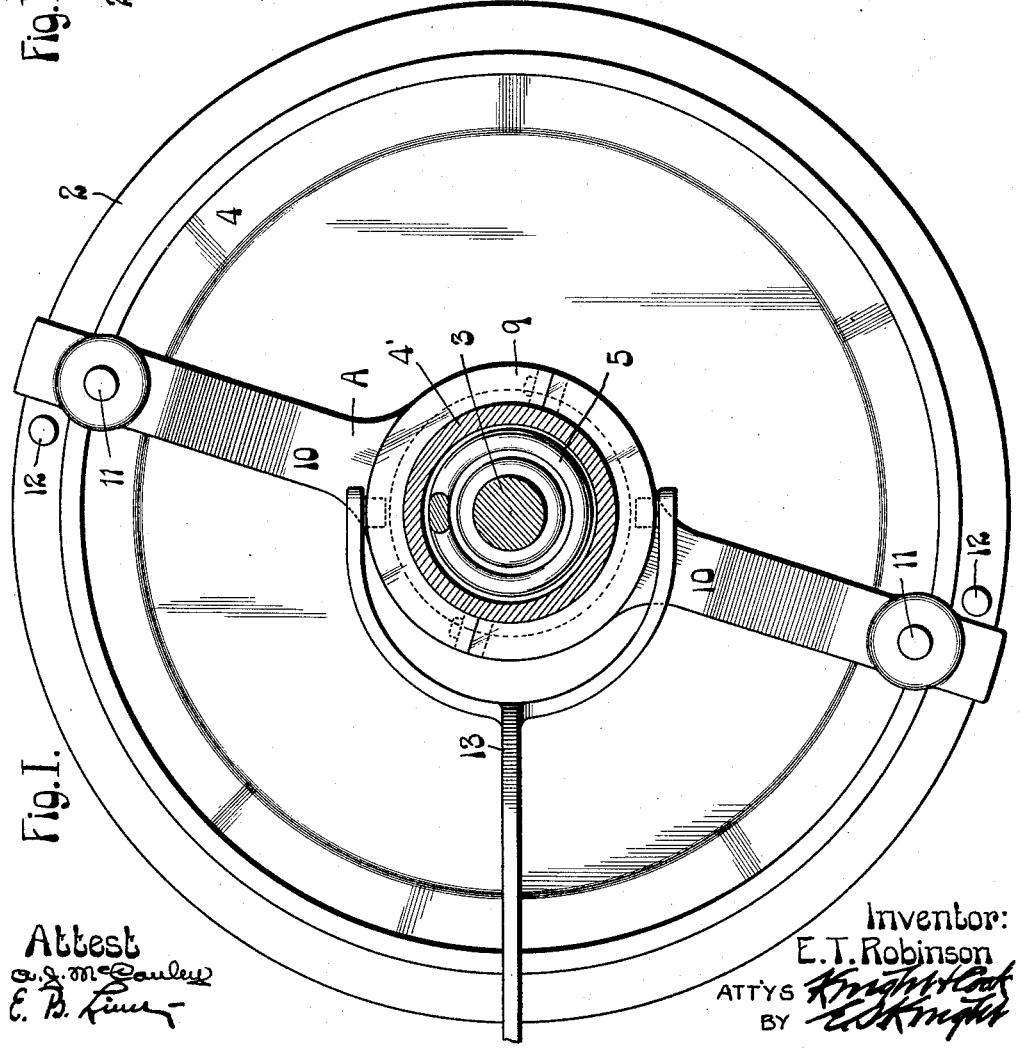
Attest
a. J. McCauley
E. B. ...
Inventor:
E. T. Robinson
ATT'YS
BY

UNITED STATES PATENT OFFICE.

EARLE T. ROBINSON, OF ST. LOUIS, MISSOURI.

CLUTCH.

1,007,977. Specification of Letters Patent. Patented Nov. 7, 1911.

Application filed October 22, 1910. Serial No. 588,412.

*To all whom it may concern:*

Be it known that I, EARLE T. ROBINSON, a citizen of the United States of America, residing in the city of St. Louis and State of Missouri, have invented certain new and useful Improvements in Clutches, of which the following is a full, clear, and exact description, reference being had to the accompanying drawings, forming a part of this specification.

My invention relates to a clutch, and has for its object the production of means whereby the clutch members of a friction clutch may be positively connected.

The ordinary type of friction clutch forms a yieldable connection between a drive shaft and a driven shaft, allowing driven mechanism to take up the load gradually, but the frictionally engaged clutch members are liable to slippage under heavy loads, and therefore it is impossible to transmit as high a degree of power from a drive shaft to a driven shaft by the use of a friction clutch as by the use of a positive clutch. In some mechanisms, however, it is highly desirable to employ a friction clutch for certain uses, and my improvement contemplates in connection with such a clutch a device that is supplemental to the friction clutch to render it of positive type when there is need of transmitting from the drive shaft to the driven shaft a greater degree of power than the frictionally engaged members of the clutch will transmit.

Figure I is a side elevation, partly in section, illustrating a clutch constructed in accordance with my invention. Fig. II is a vertical section taken approximately through the center of the clutch.

In the accompanying drawings: 1 designates a drive shaft to which a friction clutch member 2 is secured. A driven clutch member 4 having a sleeve 4' is loosely mounted on a stem at 3 at the end of the drive shaft 1 and may be forced into frictional engagement with the clutch member 2 by a spring 5, interposed between the driven clutch member 4 and a spring seat 6 carried by the stem of the drive shaft 1. The driven shaft 7 is splined to the driven clutch member 4 by a key 8.

The parts I have just described constitute a friction clutch of well known type and for which no invention, *per se*, is herein claimed.

I will now proceed to the description of the means by which the members of a friction clutch, such, for instance, as that set forth herein, may be positively connected.

The means just referred to comprises a locking device A carried by one of the clutch members 2 or 4 and means carried by the other clutch member adapted to be engaged by the locking device, with the result of effecting a positive connection between said clutch members. The locking device A is preferably composed of a ring or collar 9 encircling the sleeve 4' of the clutch member 4 and a pair of outwardly curved radial arms 10 extending from said ring to the rims of the clutch members. The arms 10 are perforated and slidably fitted to pins 11 carried by one of the clutch members at its rim, these pins being preferably carried by the rim of the clutch member 4 on which the locking device is arranged. The rim of the other clutch member 2, is provided with studs or abutments 12, so positioned as to provide for engagement therewith of the arms of the locking device when the locking device is moved longitudinally of the clutch and toward their rims.

13 is a shifter fitted to the locking device A, and by which it may be moved longitudinally of the clutch to carry its arms into such positions as to provide engagement between them and the studs 12.

In the practical use of my clutch, it may be used, when desired, in the same manner as an ordinary clutch is used, at which time the locking device A occupies the position shown in Fig. II and is inactive for any function. When, however, it is desired to create a positive driving action from one clutch member to another clutch member, the locking device A is shifted to carry its arms from the position shown in Fig. II toward the adjacent rims of the clutch members to such degree as will provide for engagement between the studs 12 of the clutch member 2 and the arms of the locking device. Upon such adjustment of the locking device, the clutch member 2 is caused to operate the locking device; and, inasmuch as this locking device is held from rotation relative to the clutch member 4, due to its arrangement upon the pins 11 carried by said last named member, the clutch member 4 is caused to be positively driven with the driving clutch member 2.

The positive driving action thus acquired may be maintained until such time as the locking device is shifted to carry it away from a position in which it will be engaged by the studs 12.

I claim:—

A clutch, comprising a drive shaft, having a stem and a clutch member secured to the drive shaft and provided with a rim carrying studs, a spring seat carried by the stem, a driven clutch member having a sleeve and mounted on the stem of the drive shaft and provided with a rim carrying pins, a spring located around the stem of the drive shaft between the driven clutch member and the spring seat, a collar encircling the sleeve and having radial arms provided with perforations receiving the pins on the rim of the driven clutch member and means for shifting the collar so as to engage the radial arms with, or disengage the latter from, the studs on the rim of the clutch member of the drive shaft.

EARLE T. ROBINSON.

In the presence of—
H. G. Cook,
E. B. Linn.

Copies of this patent may be obtained for five cents each, by addressing the " Commissioner of Patents, Washington, D. C."